United States Patent [19]

Izumi

[11] Patent Number: 5,039,222

[45] Date of Patent: Aug. 13, 1991

[54] APPARATUS AND METHOD FOR PRODUCING FOURIER TRANSFORM SPECTRA FOR A TEST OBJECT IN FOURIER TRANSFORM SPECTROGRAPHS

[75] Inventor: Akio Izumi, Kanagawa, Japan

[73] Assignee: Fuji Electric Co., Ltd., Kanagawa, Japan

[21] Appl. No.: 380,793

[22] Filed: Jul. 17, 1989

[30] Foreign Application Priority Data

Jul. 18, 1988 [JP] Japan ................... 63-178441

[51] Int. Cl.$^5$ .............................................. G01B 9/02
[52] U.S. Cl. ..................................... 356/346; 364/576
[58] Field of Search ........................ 356/346; 364/576

[56] References Cited

U.S. PATENT DOCUMENTS 4,511,986  4/1985  Bellar et al. ........................ 356/346
4,792,230  12/1988  Naganuma et al. ................. 356/346
4,847,878  7/1989  Badeau ................................ 356/346

Primary Examiner—Samuel Turner
Attorney, Agent, or Firm—Finnegan, Henderson, Farabow, Garrett, and Dunner

[57] ABSTRACT

Apparatus and a method for producing Fourier spectra for a test object utilizing a plurality of laser interference signals each having a period corresponding to a wavelength of a laser beam and being out of phase by 1/n of the wavelength of the laser beam, n being a positive integer above 1. An infrared interference signal representing the test object after the test object is irradiated with an infrared light beam is sampled at a time interval corresponding to 1/n of the wavelength of the at least one laser interference signal and n sets of sampled data corresponding to the infrared interference signal are produced. Each set of sampled data is Fourier-transformed independently from the other to generate a Fourier spectrum corresponding to each set. All of the independently generated Fourier spectra are later combined to produce a Fourier spectrum corresponding to the infrared interference signal.

25 Claims, 15 Drawing Sheets

FIG. 15
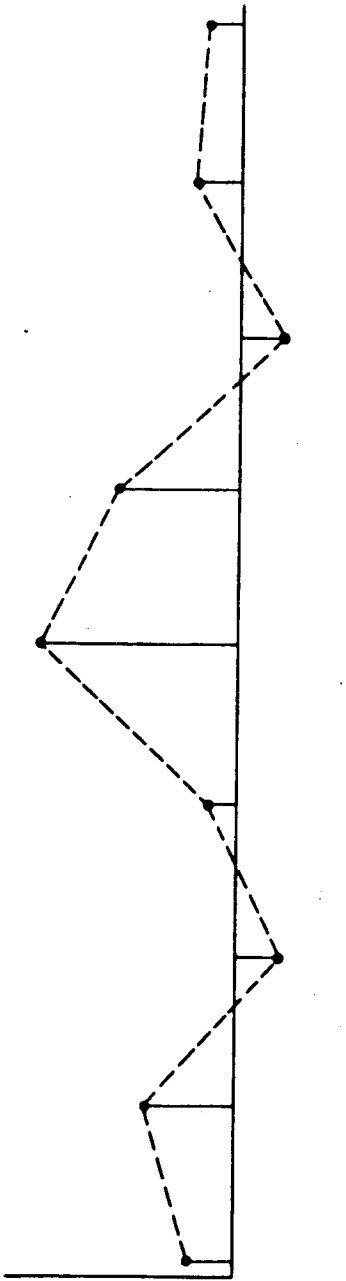
(a) FIRST PART OF DIGITAL INFRARED INTERFERENCE SIGNAL
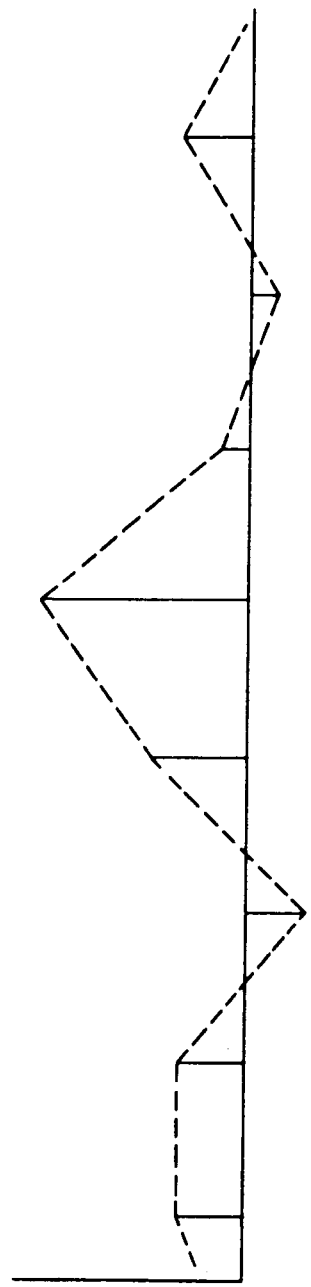
(b) SECOND PART OF DIGITAL INFRARED INTERFERENCE SIGNAL
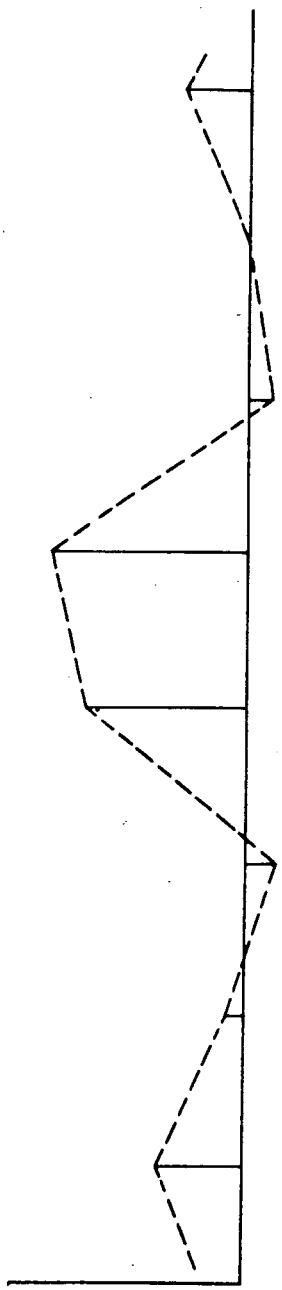
(c) THIRD PART OF DIGITAL INFRARED INTERFERENCE SIGNAL

APPARATUS AND METHOD FOR PRODUCING FOURIER TRANSFORM SPECTRA FOR A TEST OBJECT IN FOURIER TRANSORM SPECTROGRAPHS

BACKGROUND OF THE INVENTION

1. Field of the Invention

The present invention relates to an apparatus and a method for generating a Fourier spectrum for a test object in Fourier transform spectrographs.

2. Description of the Prior Art

FIG. 1 shows a schematic view of a prior art Fourier transform infrared spectrograph. Infrared rays are emitted from a light source 1. A collimating mirror 2 converts the infrared rays into collimated infrared light beams 3 which is incident on an infrared beam splitter 4. Infrared beam splitter 4 splits the infrared light beams 3 into two light beams. The two split beams are reflected by a movable reflecting mirror 6 and a fixed reflection mirror 5 respectively, and recombined in infrared beam splitter 4 to interfere with each other, and proceeds to a condenser mirror 7. A corner cube mirror is used for a fixed reflecting mirror 5 and movable reflecting mirror 6, but a plane mirror instead of the corner cube mirror may also be used.

An actuation device 8 moves movable reflecting mirror 6 forward and backward at a predetermined speed along the optical axis of infrared light beams 3 whereby recombined infrared light beam portions at splitter 4 interfere with an arbitrary optical path difference $\delta$.

A laser interferometer is incorporated in the spectrograph so that a change in optical path difference $\delta$ is measured in units of a wavelength of a laser beam 10 output from laser oscillator 9 by interference of the laser beam 10. Laser beam 10 is split into two light beams by a visible beam splitter 11 whose split surface is on the same plane of the split surface of the infrared beam splitter 4, reflected by fixed reflecting mirror 5 and movable reflecting mirror 6 to be recombined to interfere in a visible beam splitter 12, and detected in a laser detector 13. A condenser mirror 7 irradiates a sample 14 with infrared rays and a light collecting mirror 15 collects the light transmitted through sample 14. An infrared detector 16 receives the transmitted light and converts it into an electric signal. Similarly, a laser detector 13 detects a laser interference signal 17. An infrared interference signal 18 which is detected by infrared detector 16 and laser interference signal 17 which is detected by laser detector 13 are individually input to an A/D conversion board 19.

In A/D conversion board 19, infrared interference signal 18 is sampled in connection with laser interference signal 17 which is binary processed. The sampled infrared interference signal is transferred, after A/D conversion, to a computer 20 as a digital infrared interference signal 21. Computer 20 processes data representing digital infrared interference signal 21 and laser interference signal in accordance with a predetermined procedure for spectral analysis. Computer 20 has input/output units 22.

FIG. 2 shows a circuit diagram of A/D conversion board 19 of FIG. 1. Infrared interference signal 18 is amplified by an amplifier 23, and then is sampled-and-held in a sample-and-hold circuit 24. Laser interference signal 17 is amplified by an amplifier 25. Then, a low-frequency cutoff filter 26 removes the direct current component of an amplified laser interference signal which is then converted to binary form by a comparator 27. In response to the binary laser interference signal 28, a flip-flop 29 outputs a sample-and-hold control signal 30 to a sample-and-hold circuit 24 to sample-and hold an amplified infrared interference signal. Therefore, the amplified infrared interference signal is sampled and held in coordinated relations with respect to laser interference signal 17.

An A/D converter 31 converts the sampled, held and amplified infrared interference signal to digital data 32 and digital data 32 is processed sequentially by an interface circuit 33 to be a digital infrared interference signal 21 which is in turn input to computer 20. When A/D converter 31 completes the conversion, A/D converter 31 outputs a reset signal 34 to flip-flop 29 to suspend sample-holding operation.

FIG. 3 shows a timing chart for the circuit of FIG. 2. The period of sample-and-hold control signal 30 corresponds to one wavelength, $\lambda$, of laser interference signal 17.

FIG. 4 shows a flow chart for data processing for computer 20 shown in FIG. 1. Computer 20 reads digital infrared interference signal 21 and obtains a power spectrum by a Fourier analysis. If the wavenumber of infrared is represented by $v$, an optical path difference $\delta$, and digital infrared interference data $f(\delta)$, then power spectrum $P(v)$ corresponding to the irradiated sample 14 is given by $$P(v)=[F_s^{-1}(f(\delta))]^2+[Fc^{-1}(f(\delta))]^2$$

where $F_s^{-1}$ represents the sine component of inverse Fourier transform and $Fc^{-1}$ represents the cosine component of inverse Fourier transform.

Digital data corresponding to infrared interference signal 21 are subjected to spectral computation and display after the data is accumulated for a predetermined number of times in order to improve a signal to noise (S/N) ratio. Since the S/N ratio increases proportional in general to the square root of the number of times of accumulations, an increase in the number of times of accumulations is not very effective on improvement of the S/N ratio in spite of an increase in measurement time. Moreover, there arise problems such as instability and temperature change of a sample and an apparatus with time, so that the number of times of accumulations is limited to an appropriate number.

With recent advancements in high technology, demands on the accuracy of the analysis tend to increase, particularly analyzing under more severe conditions such as analyzing a minute amount of sample, thin film and surface conditions and a transient phenomena. Therefore, reducing the measurement time and processing the data at a high speed in Fourier transform spectrographs has become increasingly important.

A simple method for reducing the measurement time of the data is increasing the number of scans per unit time of movable reflecting mirror 6 by increasing a moving speed of actuation device 8 for movable reflecting mirror 6 shown in FIG. 1. However, when the moving speed of movable reflecting mirror 6 is increased, the frequency of infrared interference signal 18 is proportionally increased to the extent that the response speed of infrared detector 16 is not sufficient to follow, and therefore, detection sensitivity is decreased.

For example, in FIG. 5, timing charts (a) and (b) show laser interference signal 17 and infrared interference signal 18, respectively, at a given moving speed of movable reflecting mirror 6. Timing charts (c) and (d) show laser interference signal 17 and corresponding infrared interference signal 18, respectively, when the moving speed of movable reflecting mirror 6 is increased to twice that corresponding to timing chart (a). It is easily understood that detection sensitivity of infrared interference signal 18 corresponding to timing chart (d) is substantially decreased compared to that corresponding to timing chart (b). Further, although noise per unit bandwidth of the infrared interference signal is decreased, as its the frequency is increased, noise equivalent power (NEP) is increased, thus deteriorating the S/N ratio.

The maximum operating frequency of a collector-type detector used most widely for infrared detector 16 is about 5 kHz, although A/D converters with a conversion speed of about 1 MHz are readily available commercially. Therefore, the measurement time is limited by the operating frequency or response speed of infrared detector 16, although reducing the measurement time is critical in obtaining an accurate spectrum analysis.

SUMMARY OF THE INVENTION

The present invention overcomes these problems of the prior art.

The objects of the present invention ar to provide a data processing system for Fourier transform spectrographs having a high speed sampling capability without the necessity of increasing the moving speed of a movable reflecting mirror.

More specifically, in the apparatus and related method according to the present invention, an infrared interference signal is sampled at an interval of 1/n of the wavelength of a laser interference signal, where n is a positive integer greater than 1(one). The sampled infrared interference signal is separated into n sets of data, each set having every n-th sampled signal data. Each set of data is individually Fourier-transformed and the transformed data from each set are combined or summed together.

A sample and-hold control signal with a sampling interval of 1/n of the wavelength of the laser interference signal is generated by an optical system in an interferometer and an A/D conversion board. The measurement data which is n times the quantity of data obtainable in one scan by the above described prior art method is obtained by sampling the measured data of the infrared interference signal with a photodetector using the sample and-hold control signal as reference. Accumulation of the measured data for a predetermined number of times, $[A_k]$ (k varying from 1 to the predetermined number), is grouped into n sets of data. Each set of data is individually Fourier-transformed as an independent set of measurement data, to obtain n infrared spectra. Then, the n infrared spectra are combined. In this arrangement, it is possible to sample data at a speed n times that of the prior art method without increasing noise equivalent power (NEP) of the photodetector or adversely affecting the accuracy of the wavenumber.

The accompanying drawings, which are incorporated in and constitute a part of this specification, illustrate several embodiments of th invention and together with the description, serve to explain the principles of the invention.

BRIEF DESCRIPTION OF THE DRAWINGS

FIG. 15 is a timing chart for a digital infrared interference signal separated into three parts after accumulation according to the second embodiment of the present invention.

DESCRIPTION OF THE PREFERRED EMBODIMENTS

Reference will now be made in detail to the present preferred embodiments of the invention, examples of which are illustrated in the accompanying drawings. Where possible, the same reference numbers will be used throughout the drawings to refer to the same or like parts.

Figure 6:
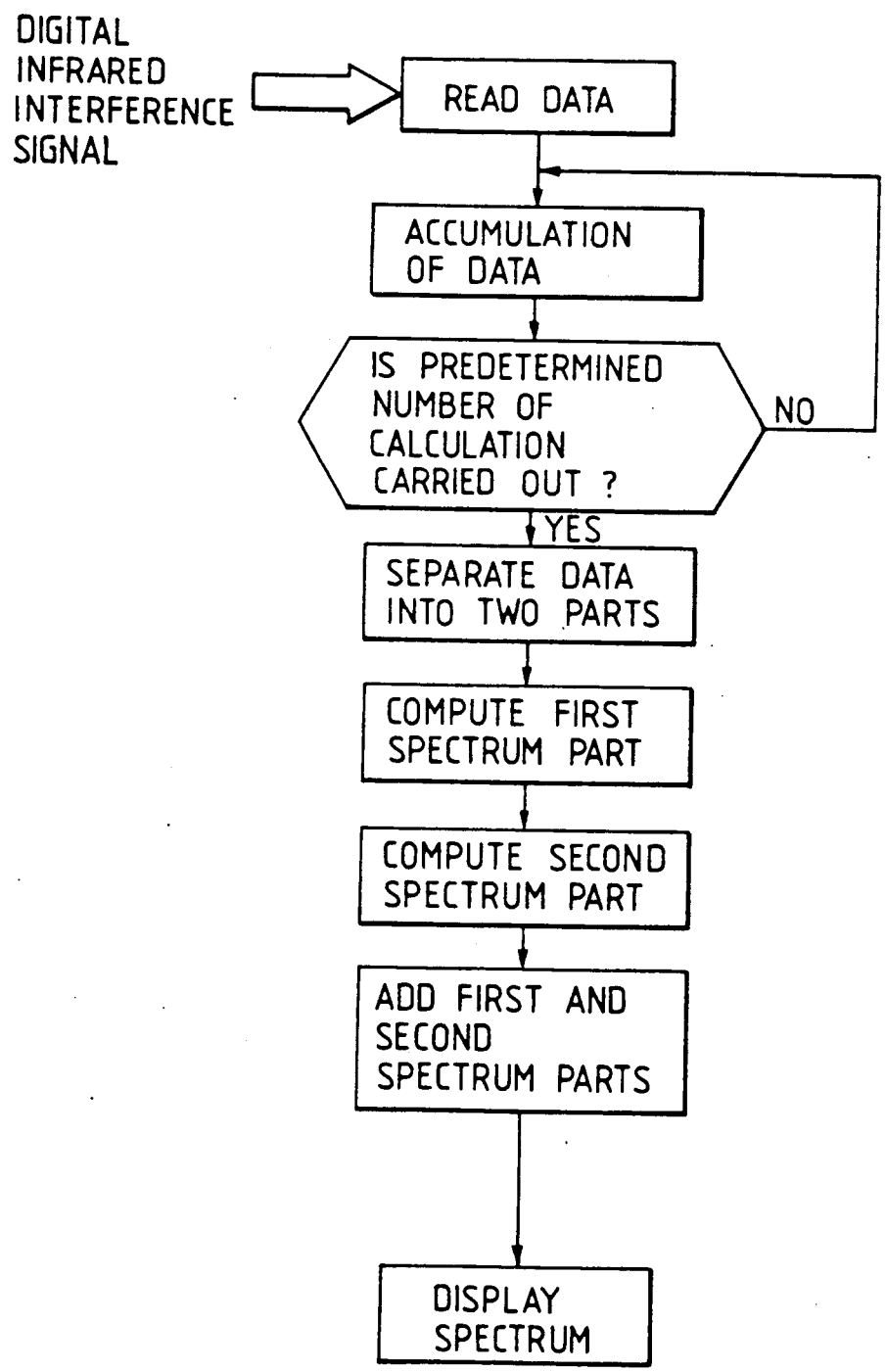
FIG. 6 is a flow chart for a data processing system according to a first embodiment of the present invention.
Figure 7:
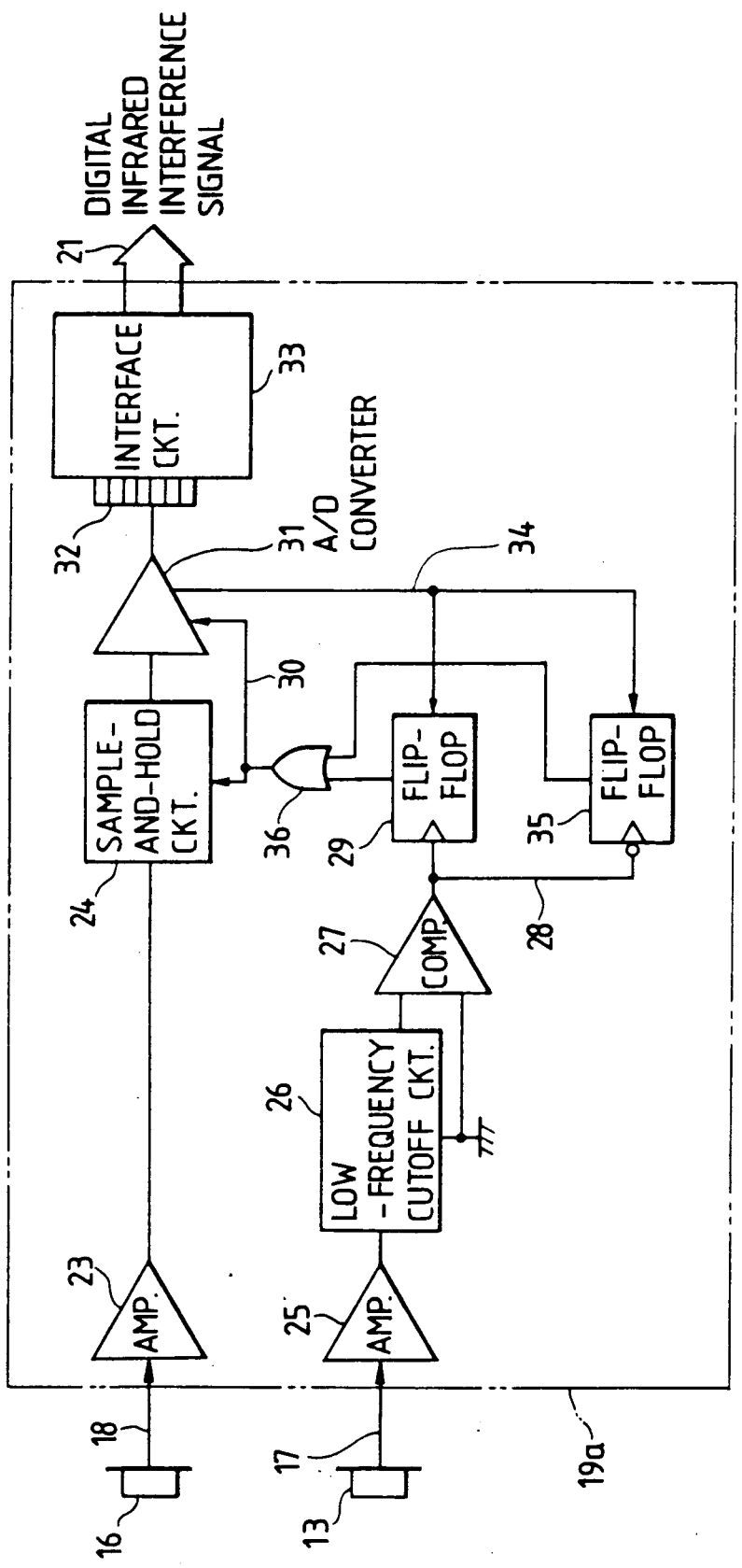
FIG. 7 is a block diagrammatic logic diagram of a A/D conversion board according to the first embodiment of the present invention.

FIG. 6 shows a flow chart for a data processing system according to a first embodiment of the present invention. FIG. 7 shows an A/D conversion board 19a for obtaining a digital infrared interference signal used in the first step of FIG. 6. For clarity, let us consider FIG. 7 first.

In FIG. 7, a flip-flop 35 transmits as an output a high ("H") signal at a fall of an input signal 28. In contrast, another flip flop 29 transmits as an output a low ("L") signal at a rise of an input signal 28. Flip-flops 29 and 35 transmit these respective output signals to OR circuit 36, which outputs a sample-hold control signal 30 to a sample-hold control circuit 24 and then to an A/D converter 31.

Figure 1:
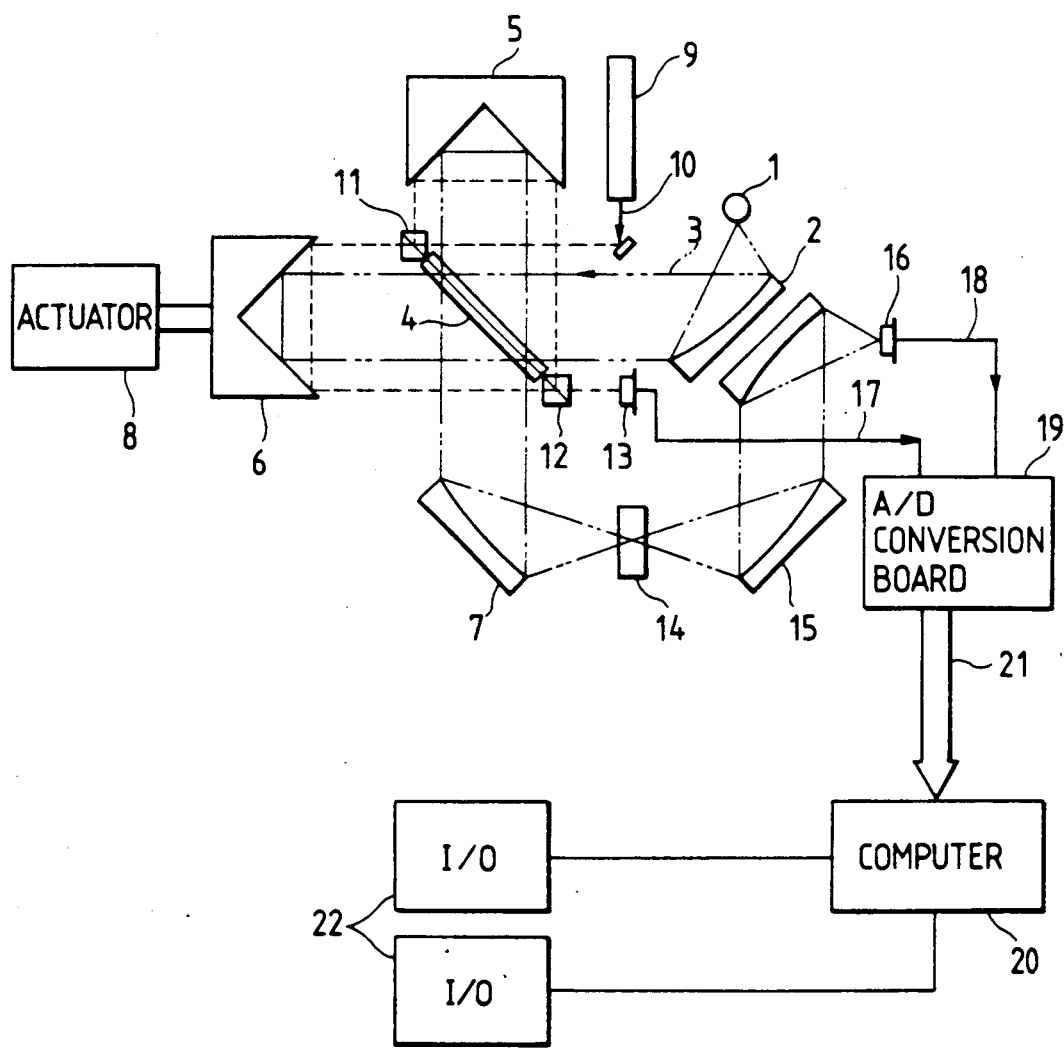
FIG. 1 a schematic view of a prior art Fourier transform infrared spectrograph.
Figure 8:
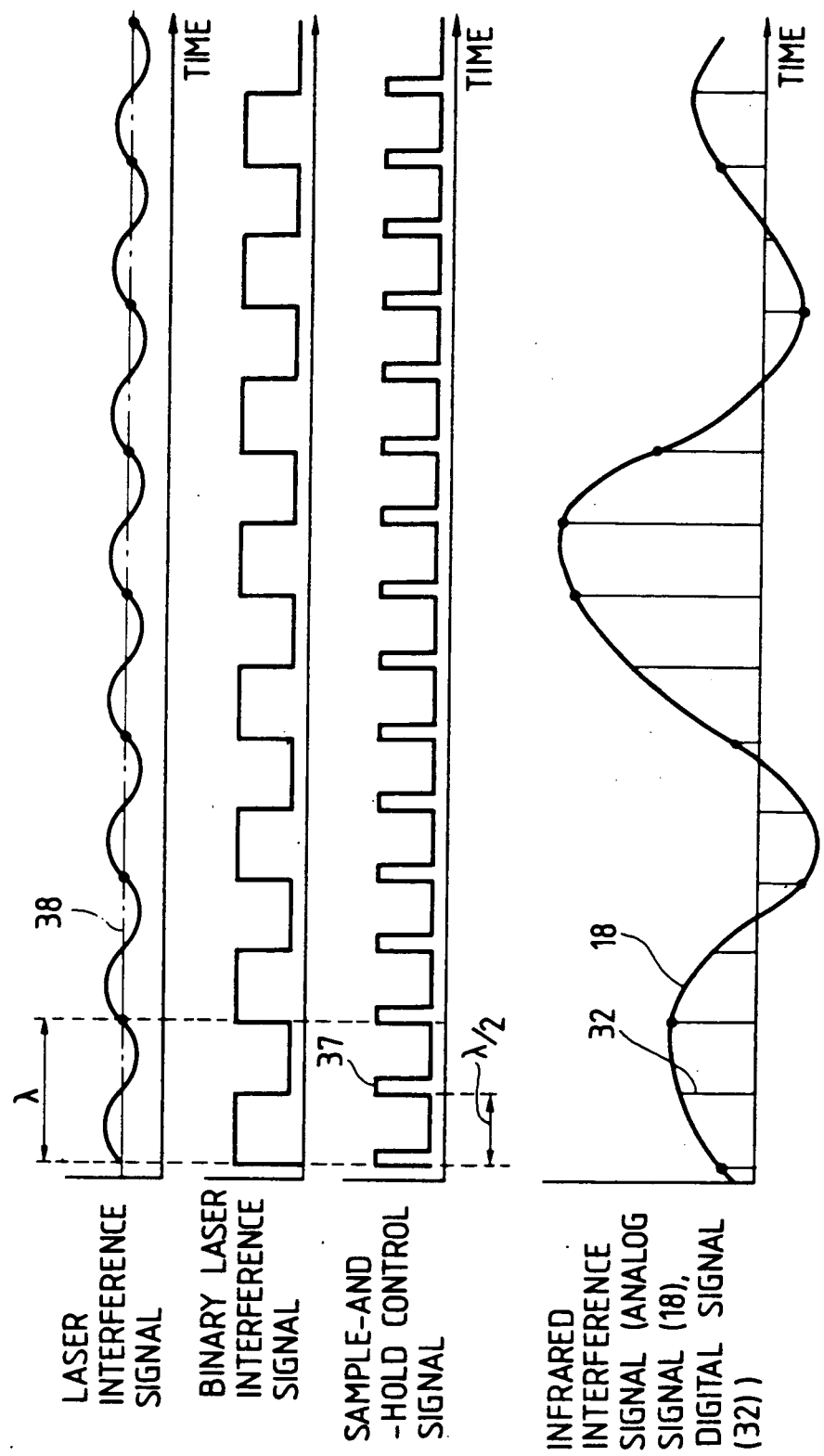
FIG. 8 is a timing chart for laser and infrared interference signals according to the first embodiment of the present invention.

In the arrangement above, an optical path difference δ which is measured by a laser interferometer of the spectrograph of FIG. 1 is sampled at an interval of ½ of a wavelength λ of laser beam 10 shown in FIG. 1. Therefore, the digital data quantity of infrared interference signal 18 shown in FIG. 7 becomes twice as large as that in the prior art. FIG. 8 shows a timing chart for various signals according to the first embodiment.

However, to have the first embodiment effectively function, it is important to obtain an accurate sampling interval of ½ of the wavelength for sample-hold control signal 30. In obtaining a prior art infrared spectrum by Fourier transforming infrared interference signal 18, discrete data corresponding to infrared interference signal 18 are obtained at a constant optical path difference interval $\Delta\delta$. Where the wavenumber region is 0 to $v_{max}$, there holds a relation $v_{max}=(\frac{1}{2})\Delta\delta$. This relation also represents the accuracy of an abscissa of the infrared spectrum.

In other words, when $\Delta\delta$ changes by 1%, $v_{max}$ is correspondingly shifted by 1%. In a commercially available spectrograph, a He-Ne laser used for the laser oscillator, and a wavenumber accuracy of $\pm 0.01$ cm$^{-1}$ is ensured. This corresponds to an accuracy of about $\pm 10^{-4}$% of sampling interval corresponding to the wavelength of laser beam 10 shown in FIG. 1.

In other words, the sampling interval ensured by sample-and-hold control signal 30 shown in FIG. 8, without further measurement, would be an interval λ between the rise of every other sample pulses 37 of sample-and-hold control signal 30, because an interval λ/2 between the rise of adjacent sample pulses 37 of sample-hold signal 30 is not in general ensured for reasons which can also be explained as follows.

Because a comparator 27 shown in FIG. 7 generally produces a hysteresis voltage for a threshold value 38 shown in FIG. 8 in order to preclude chattering due to noise, the accuracy of interval λ/2 between adjacent sample pulses 37 is not ensured, although the accuracy of interval λ between every other sample pulses is ensured because interval λ is binarized always under same conditions.

Furthermore, interval λ/2 is affected by characteristics of a low frequency cutoff filter 26, the level of binary bits and the fluctuations in the laser power, so that sufficient accuracy is not obtained. Since the accuracy of interval λ/2 would not be ensured to a sufficiently high degree, when the data which is doubled in quantity is Fourier transformed in a lump the accuracy of the wavenumber that appears on the abscissa for the infrared spectrum would be deteriorated.

In the first embodiment of the present invention, these problems are solved by dividing a digital infrared interference signal 21 shown in FIG. 7, which is sampled at an interval of a wavelength λ of laser beam 10 and accumulated for a predetermined number of times, into two sets of data. Each set of data is independently Fourier-transformed and then both sets of transformed data are combined.

Figure 9:
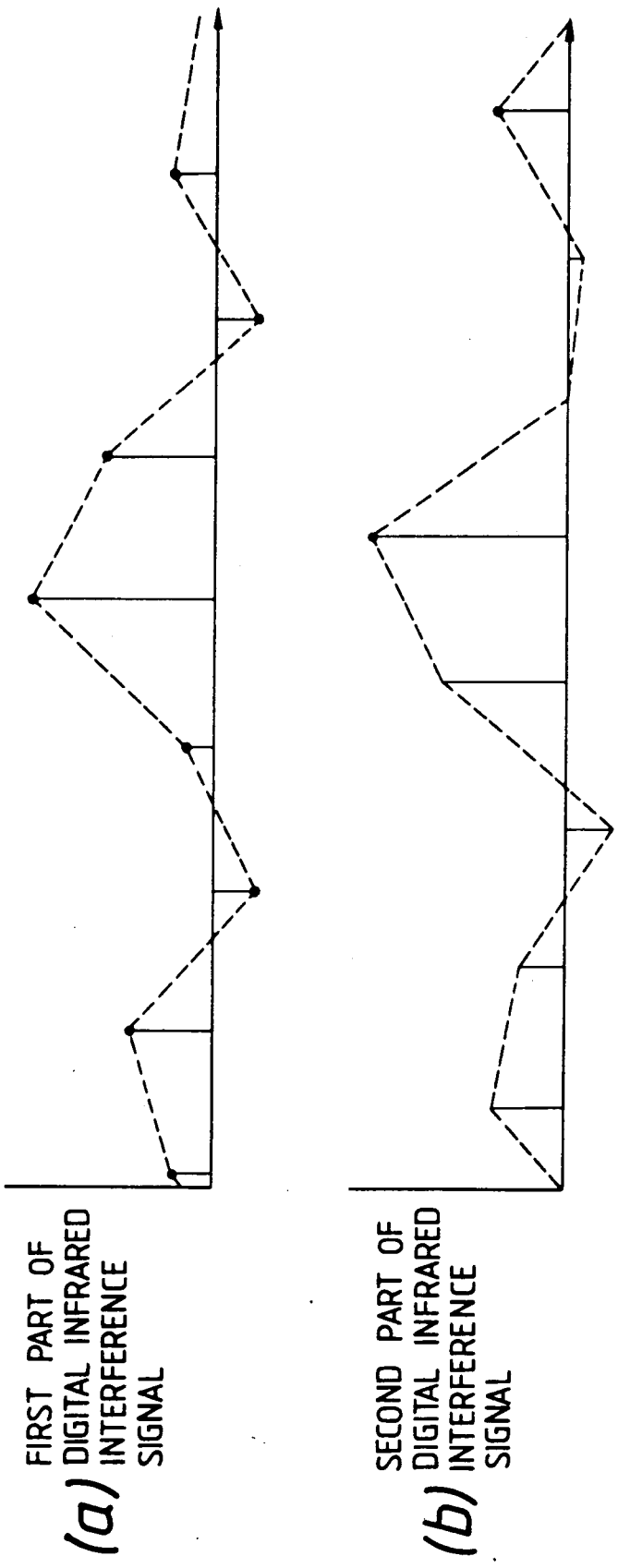
FIG. 9 is a timing chart for a digital infrared interference signal separated into two parts after accumulation according to the first embodiment of the present invention.

In FIG. 9, timing charts (a) and (b) show digital infrared interference signal 21 sampled in response to the output of flip-flop 29, in FIG. 7, and sampled in response to the output of flip-flop 35, respectively. Since both timing charts (a) and (b) of FIG. 9 are equivalent to those obtained by sampling the same digital infrared interference signal in response to signal having two different phases of the same frequency, resulting infrared spectra which are phase-corrected to obtain real functions for infrared power spectra or other spectra are identical.

Further, the sampling interval for timing charts (a) and (b) are ensured for one wavelength λ of the laser oscillator so that the accuracy of the resulting measurement is equivalent to carrying out the measurements twice with a predetermined number of accumulations. Furthermore, since the two spectra are combined, the measurement time required according to the first embodiment is a half of the time required in the prior art.

It is now appropriate to consider FIG. 6.

FIG. 6 shows a flow chart relating to processing of the sampled digital infrared interference signal according to the first embodiment of the present invention. In FIG. 6, the sampled data are divided into two sets, and after individually obtaining respective spectra for each set, the respective spectra are combined.

Figure 10:
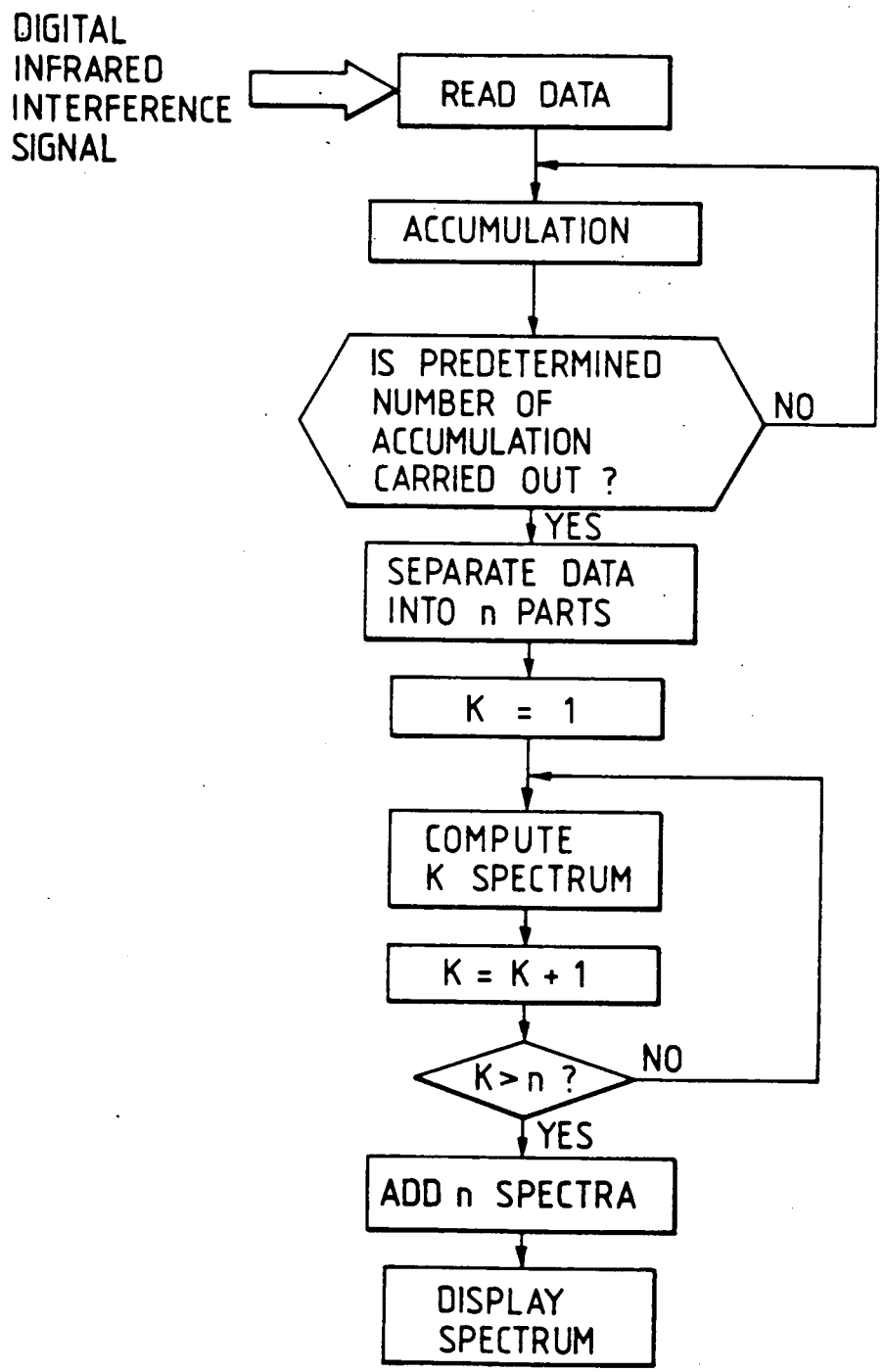
FIG. 10 is a flow chart of a data processing system according to a second embodiment of the present invention.
Figure 11:
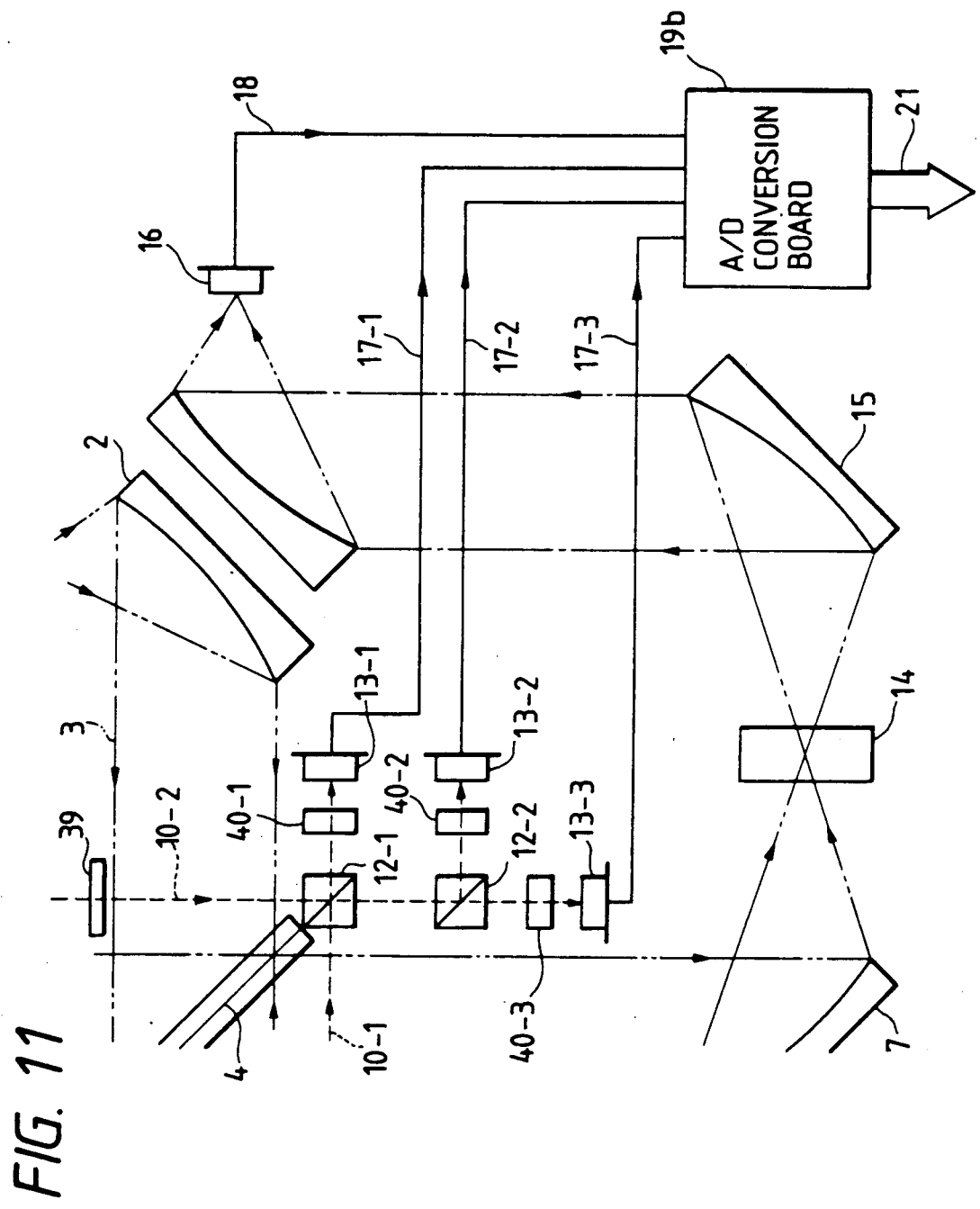
FIG. 11 is a schematic diagram of a Fourier transform infrared spectrograph according to a second embodiment of the present invention.
Figure 12:
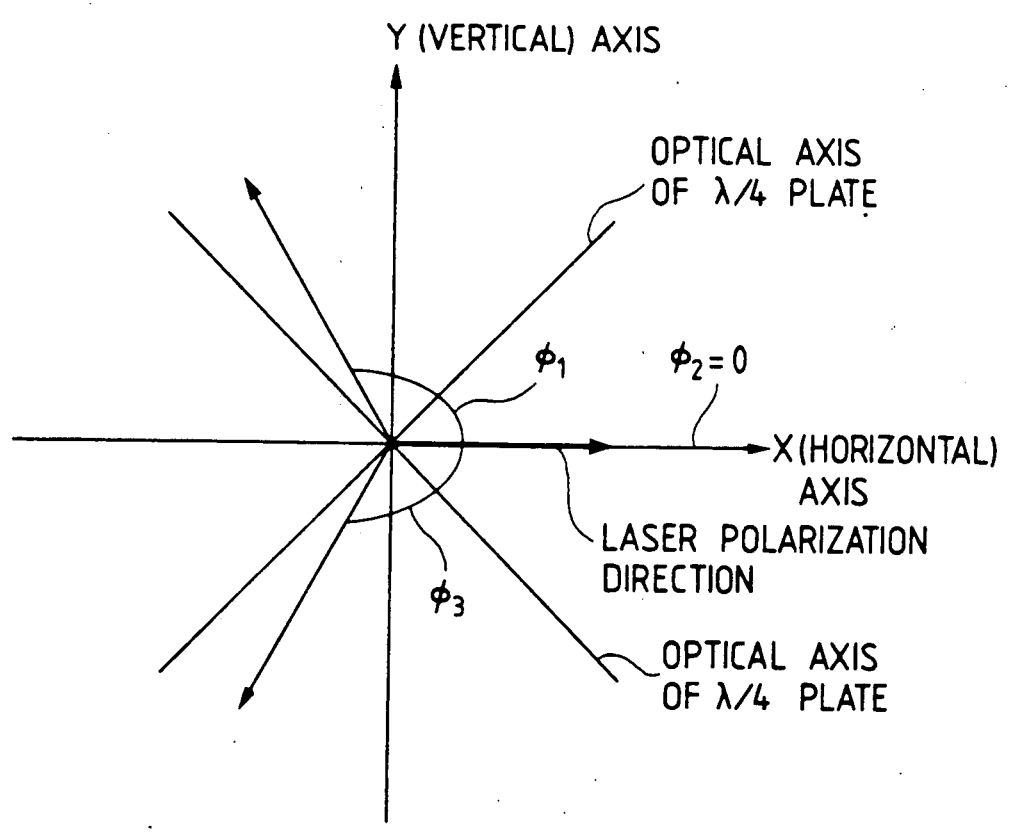
FIG. 12 is a diagram showing relative orientations of optical elements of the spectrograph of FIG. 11.
Figure 13:
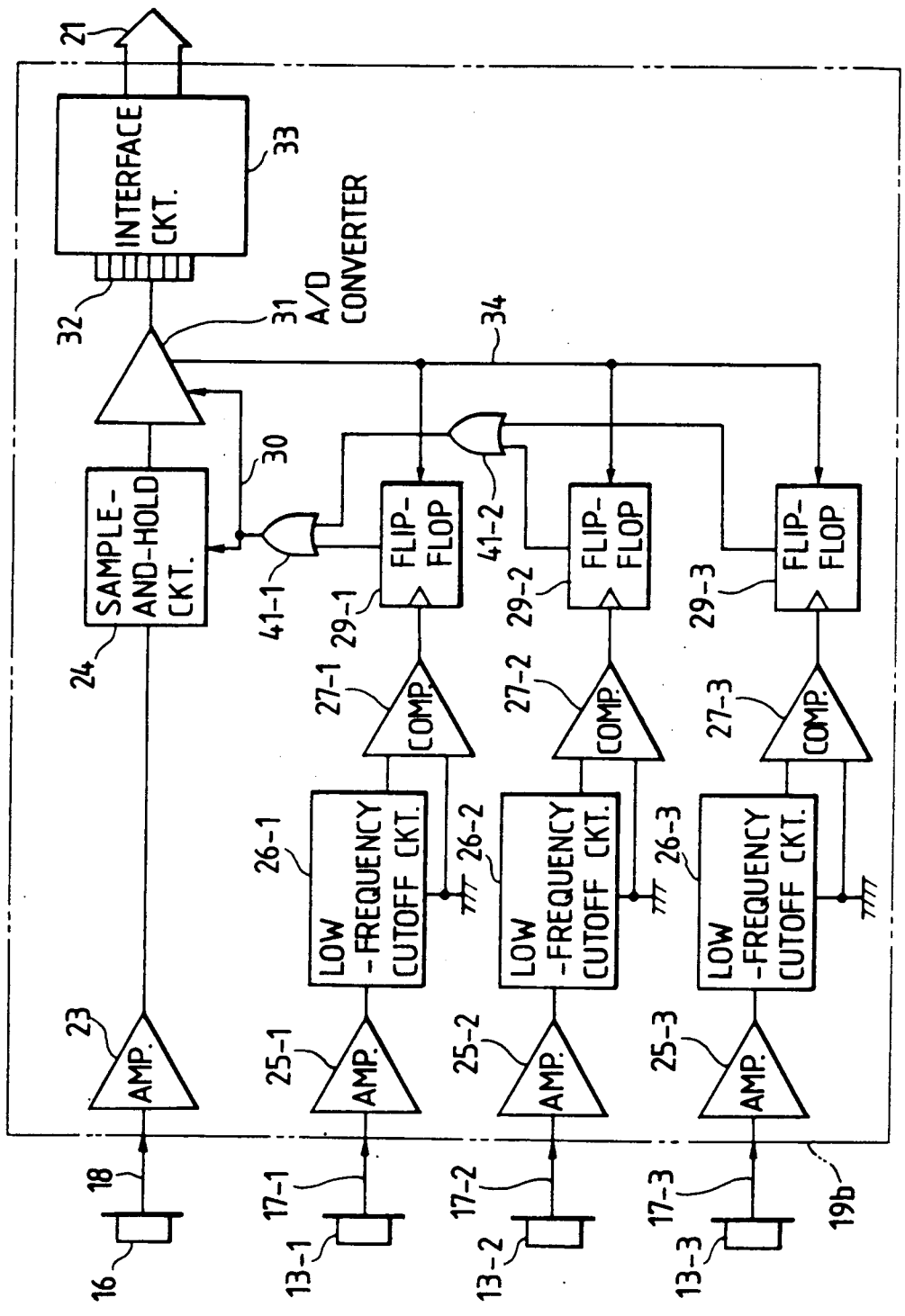
FIG. 13 is a block-diagramatic logic diagram of an A/D conversion board according to the second embodiment of the present invention.

FIG. 10 show a flow chart for data processing according to a second embodiment of the present invention, which basically is a generalization of the first embodiment of FIGS. 6-9. FIG. 11 and FIG. 12, respectively, show an optical system in a laser interferometer and relative orientations of optical elements with respect to the optical axis respectively. FIG. 13 shows a circuit diagram of an A/D conversion board 19b according to the second embodiment.

In FIG. 11 a quarter wavelength λ/4 plate 39 is disposed on one side of an optical path of the laser interferometer. Two visible beam splitters 12-1 and 12-2 splits a laser beam into three beams after interference of portions 10-1 and 10-2 at beam splitter 12-1. Each spit beam is analyzed by respective analyzers 40-1, 40-1 and 40-3 and detected by corresponding laser detectors 13-1, 13-2 and 13-3. Further, a laser oscillator like laser oscillator 9 shown in FIG. 1, according to the second embodiment, is an oscillator which outputs a linearly polarized laser beam 10. Moreover, the reflected laser beam portion 10-1 is reflected from a movable reflecting mirror like mirror 6 shown in FIG. 1 with little change in linear polarization. The optical axis of λ/4 plate 39 is set such that a nearly circular polarization for a reflected laser beam 10-2 from fixed reflecting mirror 5 shown in FIG. 1 is obtained. Visible beam splitters 12-1 and 12-2 are each made of a phase-free and polarization-free beam splitter which simply splits an incoming light beam and does not affect phase or polarization characteristics of the wavelength of the laser used.

Reflected laser beams 10-1 and 10-2 are analyzed by analyzers 40-1, 40-2 and 40-3 and phase relationship among laser interference signals 17-1, 17-2 and 17-3 is arbitrarily established by adjusting positions of the respective analyzers with respect to the optical axes of principal optical elements as shown in FIG. 12. In FIG. 12, the direction of propagation of the laser beam is a Z direction perpendicular to the optical axes of the quarter wave plates and, as shown, perpendicular to the plane of the paper.

Assuming the laser beam is completely coherent, a laser interference signal 17-1 output from laser detector 13-1 which corresponds to analyzer 40 1 and is arranged as shown in FIG. 11 is expressed as:

$$I_1 = A[\cos\Phi_1 \cdot \cos(\omega t - 2\pi\delta/\lambda) + \cos(\omega t + \phi_1)]^2 \ldots \quad (1)$$

where an azimuth of analyzer 40-1 is defined as $\phi_1$ rad, an optical path difference of the laser interferometer is δ, and angular frequency of the light is ω, and A is a constant which corresponds to characteristics of the optical system and the detectors.

The first term in the square brackets of Eq.(1) represents contribution from a linear polarization, while the second term represents contribution from a circular polarization. Further, an overbar above the right-hand side of Eq.(1) means the time average.

Rearranging Eq.(1), $$\frac{I}{A} = \overline{\frac{\cos^2\Phi_1 \cdot \cos^2(\omega t - 2\pi\delta/\lambda) + \cos^2(\omega t + \Phi_1)}{+ 2\cos\Phi_1 \cdot \cos(\omega t - 2\pi\delta/\lambda) \cdot \cos(\omega t + \Phi_1)}}$$
$$= \frac{1 + \cos^2\Phi_1}{2} + \cos\Phi_1 \cdot \cos(2\pi\delta/\lambda - \Phi_1) \quad (2)$$

As seen from Eq.(1), laser interference signal 17-1 output from laser detector 13-1 for optical path difference δ includes a first term in the equation which is a bias component, and a second term which is an AC component. The phase of these components is defined by azimuth $\Phi_1$ of analyzer 40-1. Therefore, laser interference signals 17-1, 17-2 and 17-3, each of which is phase shifted by λ/3 with respect to the other, are generated by setting in advance azimuths $\phi_1$, $\phi_2$ and $\phi_3$ of respective analyzers 40-1, 40 2 and 40-3, as shown in FIG. 12.

FIG. 13 shows a circuit diagram of A/D conversion board 19b of FIG. 11. In FIG. 13, three sample-and-hold control signals each of which is phase shifted with respect to the other, are transmitted as outputs from respective flip flops 29-1, 29-2 and 29-3. The sample-and-hold control signals are then supplied as inputs to OR circuits 41-1 and 41-2. A sample and hold control signal 30 which is derived as an output from OR circuit 14-1 is supplied as input to a sample and hold circuit 24 and A/D converter 31.

Figure 2:
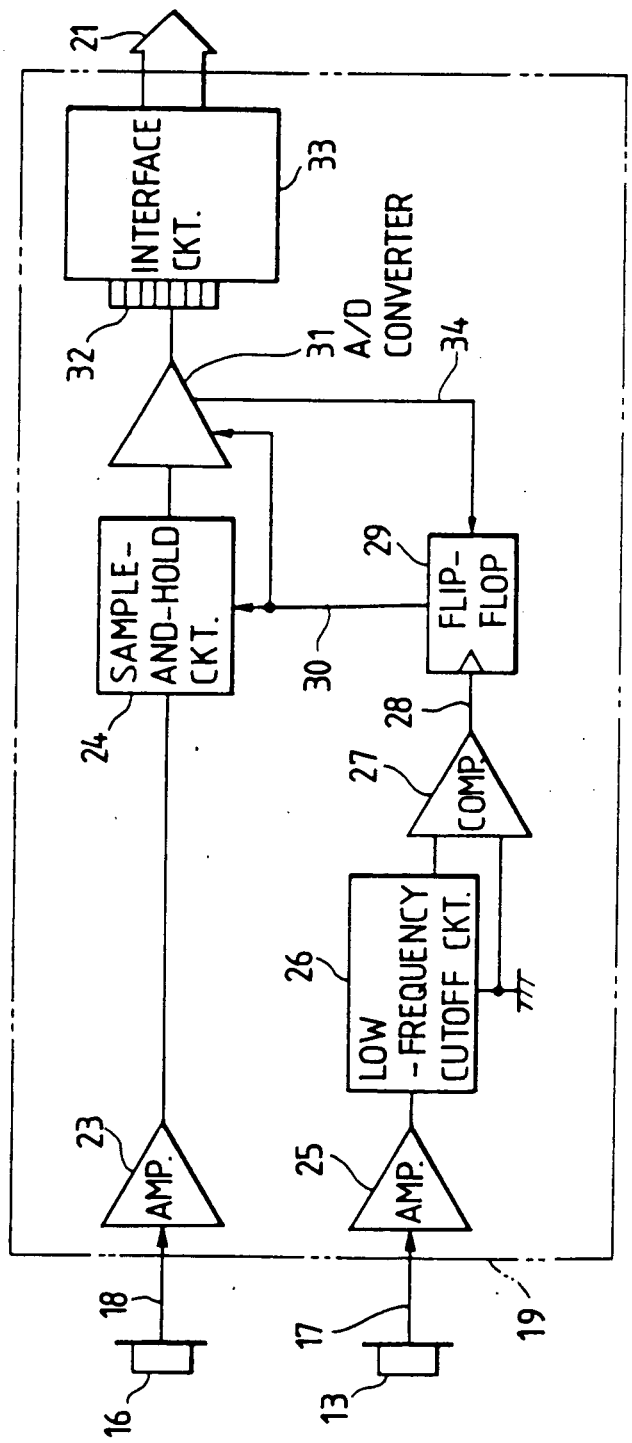
FIG. 2 is a circuit diagram of a A/D conversion board used in the spectrograph of FIG. 1.
Figure 3:
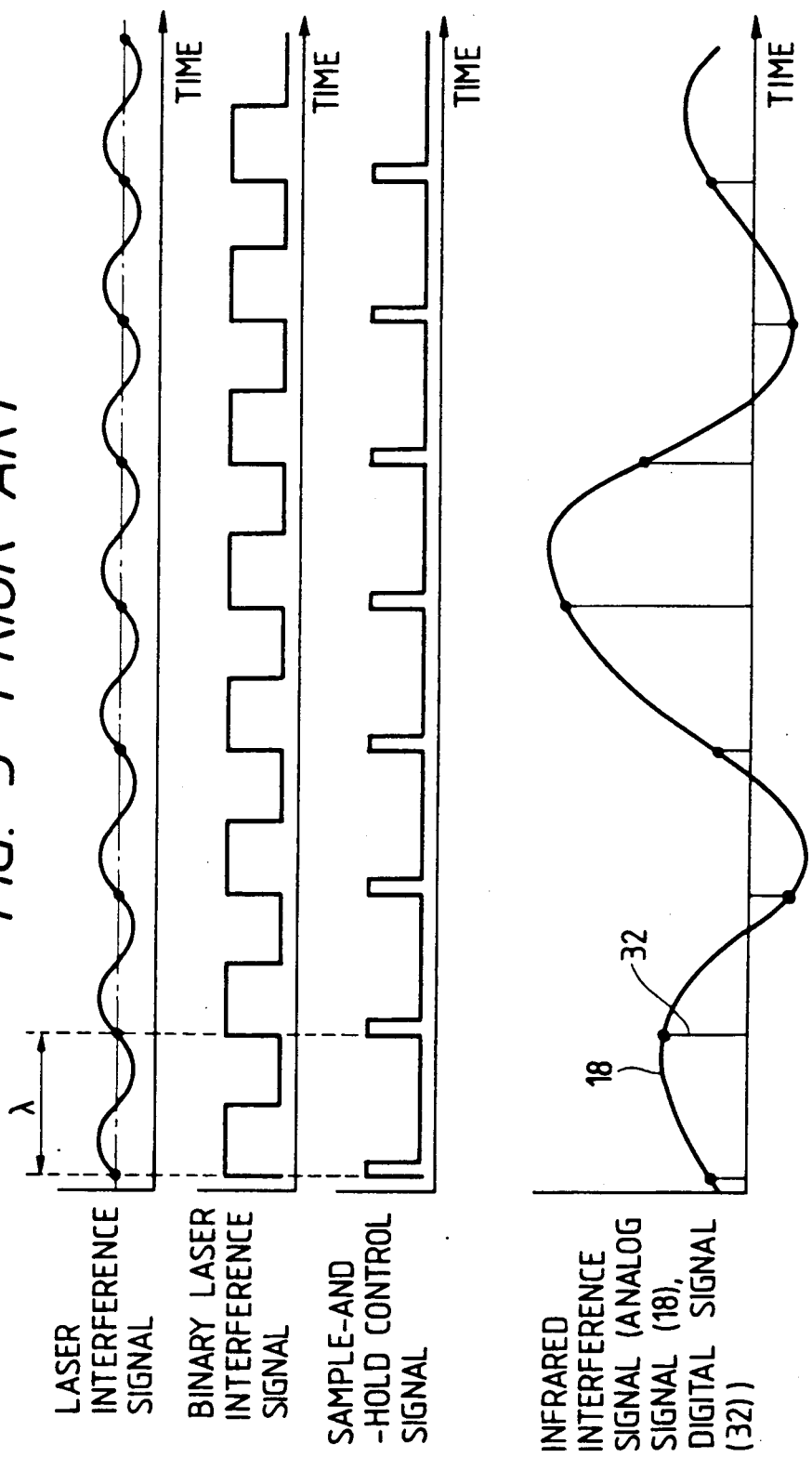
FIG. 3 is a timing chart for laser and infrared interference signals at a first scanning speed in the A/D conversion board of FIG. 2.
Figure 4:
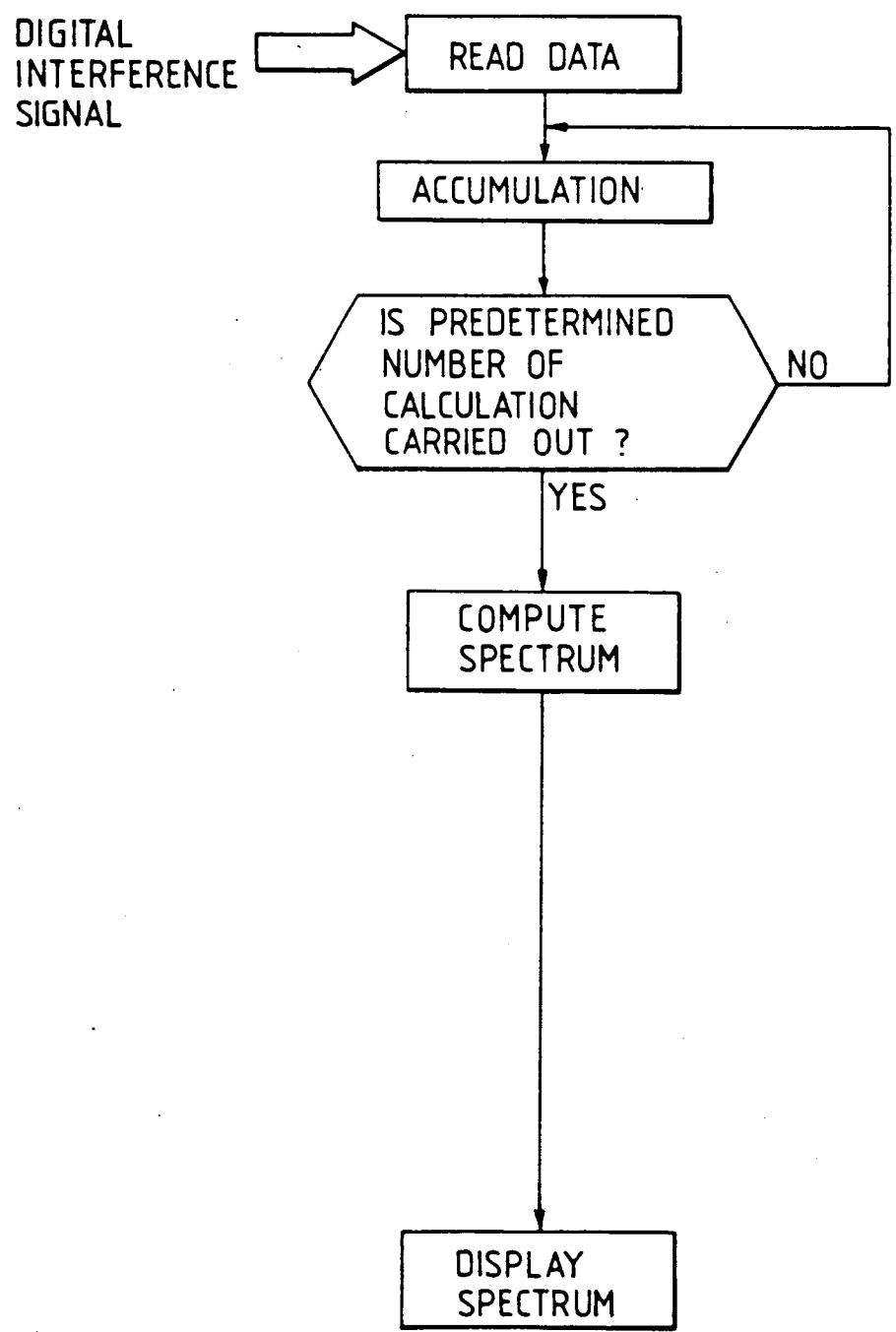
FIG. 4 is a flow chart for a data processing system used in the spectrograph of FIG. 1.
Figure 5:
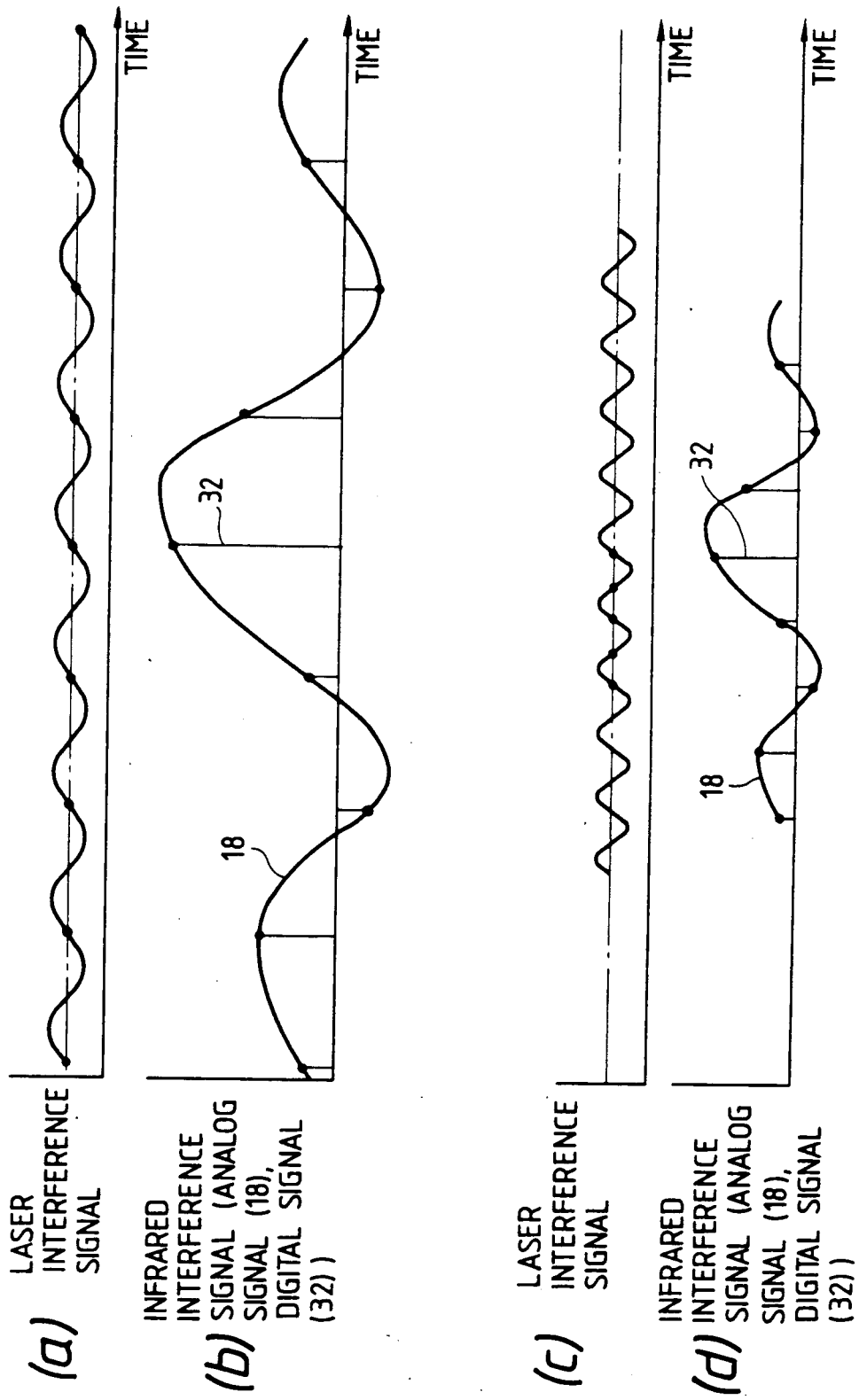
FIG. 5 is a timing chart for laser and infrared interference signals at a second scanning speed in the A/D conversion board of the prior art system of FIG. 2.
Figure 14:
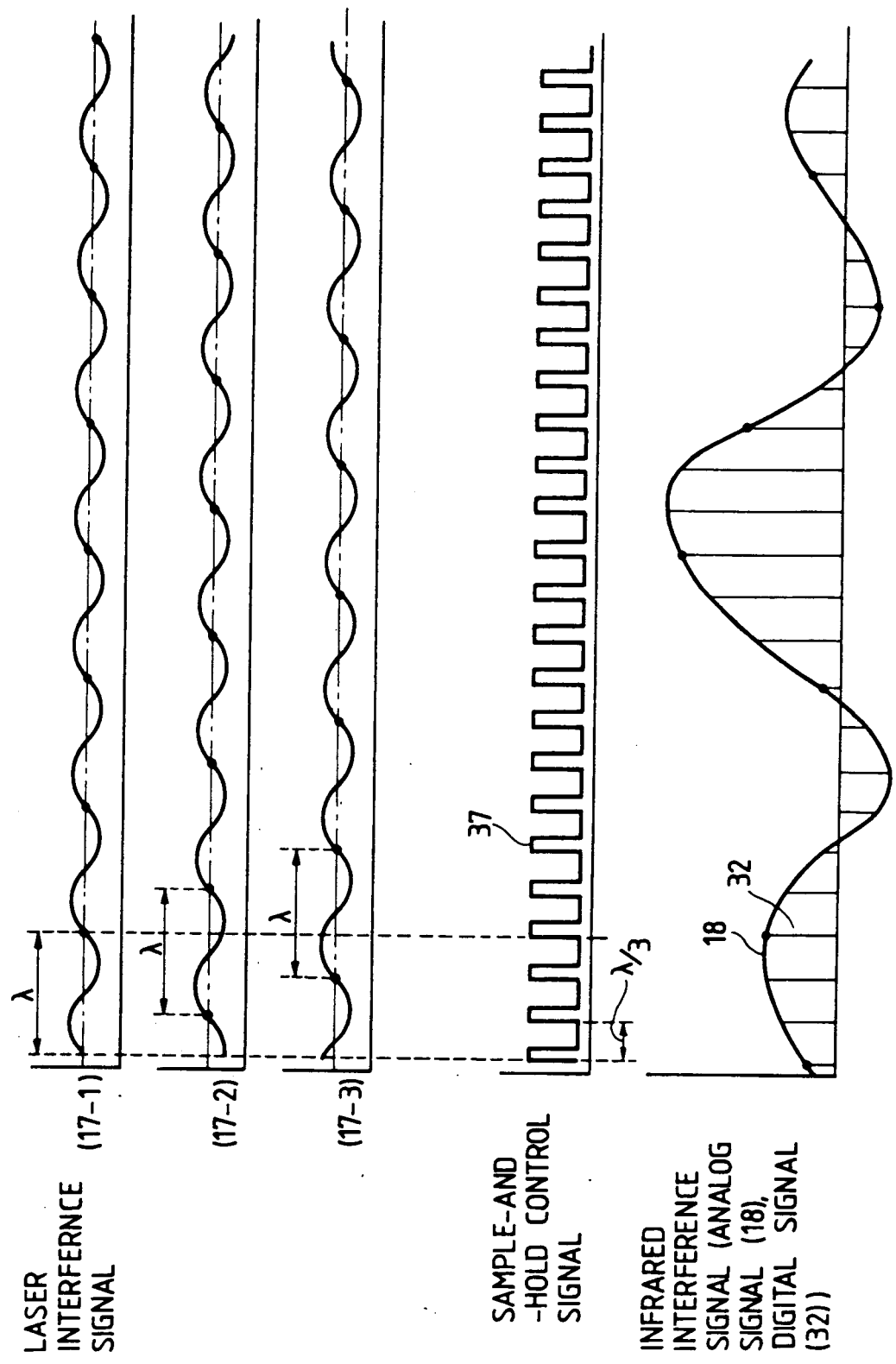
FIG. 14 is a timing chart for laser and infrared interference signals according to the second embodiment of the present invention.

Optical path difference δ like the difference δ measured by the laser interferometer shown in FIG. 1 is sampled at a time interval of ⅓ of the wavelength of the laser. Therefore, the quantity of digital data of the infrared interference signal obtained is three times that obtainable by the prior art in FIG. 2. FIG. 14 shows a timing chart for laser and infrared interference signals according to the second embodiment.

In the second embodiment described above, one wavelength λ is divided into three parts (λ/3) and three times as much data as in the prior art can be effectively obtained in one scanning operation. It is theoretically possible to obtain n times the quantity obtainable by the prior art, where n is a positive integer above 1, provided that an optical system is equipped with n laser detectors and an A/D conversion board circuit can handle each detector. However, the maximum quantity of data obtainable is limited by the capability of A/D converter 31. Further, as shown in FIG. 13, since no input to flip-flips 29-1, 29 2, and 39-3 is permitted prior to outputting of a reset signal 34 from A/D converter 31, the number of circuits of the system must be determined with certain margins, considering factors such as stability of scanning speed, and accuracy of interval λ/n.

Furthermore, digital infrared interference signal 21 in FIG. 1 corresponding to infrared interference signal 18 input to A/D conversion board 19 is transferred to computer 20 sequentially as discrete data at a constant time interval Δδ of optical path differences. The wavenumber region that can be measured in one operation is limited by the sampling theorem as mentioned in connection with the first embodiment. The sampling interval for sample-hold signal 30 in FIG. 13 that in the absence of the inventive control feature would be ensured would be one wavelength, λ, which corresponds to every three rises of sample pulses 37. In other words, interval λ/3 obtained by setting and adjusting analyzers 40-1, 40-2 and 40-3 shown in FIG. 13 would not necessarily be ensured with high accuracy.

The second embodiment of the present invention solves this problem by separating digital interference signal 21 which is measured at an interval λ/3, which is ⅓ of the wavelength of laser beam 10, and which is accumulated for a predetermined number of times into three sets of data, each set having every third measurement. Each set of data is analyzed independently of the others. All the individually analyzed (transformed) data are then combined. FIG. 15 shows a timing chart (a) of a first set of data sampled by laser interference signal 17-1 output from laser detector 13-1, and (b) and (c) second and third sets of data sampled by laser interference signals 17-2 and 17-3, respectively.

Timing charts (a), (b) and (c) represent signals obtainable by sampling the same infrared interference signal with signals each having a phase shifted by λ/3 with respect to the other. Therefore, an identical infrared spectrum will be obtained when phase corrections are given to the infrared interference signal to obtain real functions for the infrared power spectra or other spectra.

In other words, the sampling intervals for each set of data in corresponding time charts (a), (b) and (c), as discussed previously, would be ensured for one wavelength λ of the laser, but rendered more effective by the invention. Therefore, the resulting accuracy is equivalent to that of taking three measurements with accumulations for a predetermined number of times. Accordingly, by accumulating the three spectra, the measurement can be completed ⅓ of the time required in the prior art. Theoretically, n times as much data in one scanning operation as obtainable in the prior art, can be acquired, and the measurement time can be reduced to 1/n times that required in the prior art.

It will be apparent to those skilled in the art that various modifications and variations can be made in the embodiments of the present invention without departing from the scope or spirit of the invention.

As an example, as shown in FIG. 10, in the flow chart for a data processing system according to the second embodiment, although three data separations or n=3 for the embodiment is described, n can be greater than 3. Further, each embodiment has been described in reference to a Fourier transform infrared spectrograph. However, the present invention is not limited to an infrared spectrograph and modified analysis techniques can be readily devised in harmony with the above-described principles. Plane mirrors instead of cubic mirrors can be used for reflecting mirrors 5 and 6 a shown in FIG. 1.

In reference to the second embodiment, in the situation where the laser beam travels forwardly and backwardly through a λ/4 plate, a λ/8 plate in place of the λ/4 plate may be desired to obtain the same effect as that of the λ/4 plate for the effective optical path.

Further, instead of one unit of laser oscillator 9 as shown in the embodiments described above, a plurality of oscillators can be use. Furthermore, the laser beam can be split with a beam splitter or the like before it enters the interferometer.

In summary, in a data processing system for Fourier transform spectrographs according to the embodiments of the present invention, an infrared interference signal is sampled at an interval of 1/n of wavelength λ of a laser interference signal. The sample infrared interference signal is separated into n sets of data, each set having every n-th sampled data. Each set of data is independently Fourier-transformed, and all sets of transformed data are then combined. The present invention provides several advantages over the prior art.

For example, by generating a sampling signal having intervals of 1/n of the wavelength of the laser beam from the laser interference signal, and sampling the infrared interference signal in response to the sampling signal, it becomes possible to obtain in one scanning operation a quantity of measured data which is n times that obtainable by the prior art. Further, a spectrum from the measured data is obtained by independently Fourier transforming and recombining each of the n sets of data of which accuracy is ensured; and it can process permit data at a speed which is n times the speed permitted in the prior art.

What is claimed is:

1. Apparatus for producing an analysis spectrum for a test object, comprising:
   first and second light sources for generating first and second light beams, respectively;
   means, coupled to the first light source, for generating one or more first interference signals having a time period corresponding to the wavelength of the first light beam;
   means, coupled to the second light source, for irradiating the test object with the second light beam to obtain characteristics of the test object;
   means, coupled to the irradiating means, for generating a second interference signal representing an irradiated test object;
   means, coupled to said first and second interference signal generating means, for sampling the second interference signal at a time interval corresponding to 1/n of said time period of the first interference signal to produce sampled data representing the second interference signal;
   means, coupled to said sampling means, for producing n sets of data, each set containing data representing the sampled data at every nth time interval, n being a positive integer greater than unity;
   means, coupled to said producing means, for individually generating an analysis spectrum corresponding to said each set of data; and
   means for combining all of the individually generated analysis spectra to produce a resultant analysis spectrum representing the second interference signal.

2. The apparatus of claim 1, where n is 2.

3. The apparatus of claim 1, where n is 3.

4. The apparatus of claim 1, wherein the first light beam is a laser beam.

5. The apparatus of claim 1 wherein said second light beam is an infrared light beam.

6. The apparatus of claim 2, wherein the means for sampling the second interference signal includes a pair of flip-flops, each producing a sample-and-hold control signal having a wavelength substantially equal to the time period of the first interference signal and being out of phase by ½ of the time period with respect to the other, the second interference signal being sampled by each of the sample-and-hold control signals at a time interval corresponding to the phase of a respective sample-and-hold control signal.

7. The apparatus of claim 1, wherein the one or more first interference signal comprises m first interference signals, m being positive inter about 1, said m first interference signals being out of phase with respect to one another by 1/m of the time period of one of the m first interference signals.

8. The apparatus of claim 7, wherein said means for sampling the second interference signal includes m flip-flops each corresponding to a respective one of the m first interference signals.

9. The apparatus of claim 7, further comprising a quarter wavelength plate for effecting the polarization of the first light beam.

10. The apparatus of claim 3, further comprising m beam splitters for splitting the first light beam into m light beams each corresponding to a respective one of the m first interference signals.

11. The apparatus of claim 10, further comprising m sets of analyzer and detector each set corresponding to a respective one of the m light beams for analyzing a respective incoming light beam and converting the analyzed light beam into a corresponding first interference signal.

12. The apparatus of claim 1, wherein the analysis spectrum is Fourier spectrum.

13. The apparatus of claim 7, wherein said integer m is three(3).

14. The apparatus of claim 13, wherein said means for sampling the second interference signal includes three (3) flip-flops each corresponding to a respective one of the three first interference signals.

15. A method for producing an analysis spectrum for a test object, comprising:
   generating one or more first interference signals having a time period corresponding to the wavelength of a first light beam;
   irradiating the test object with a second light beam to obtain characteristics of the test object;
   generating a second interference signal responsive representing the irradiated test object;
   sampling the second interference signal at a time interval corresponding to 1/n of the time period of the first interference signal to produce sampled data representing the second interference signal;
   producing n sets of data, each set containing data representing the sampled data at every nth time interval, n being a positive integer greater than unity;
   individually generating an analysis spectrum corresponding to said each set of data; and
   combining all of the individually generated analysis spectra to produce an analysis spectrum representing the second interference signal.

16. The method of claim 15, where n is 2.

17. The method of claim 15, where n is 3.

18. The method of claim 15, wherein the first light beam is a laser beam.

19. The method of claim 15, wherein the second light beam is an infrared light beam.

20. The method of claim 15, wherein the step of sampling the second interference signal includes generating a pair of sample-and-hold control signals having a time period substantially equal to the time period of the first interference signal and being out of phase by ½ of the time period with respect to the other, and sampling the second interference signal with each of the generated sample-and-hold control signals at a time interval corresponding to the phase of a respective sample-and-hold control signal.

21. The method of claim 15, wherein the step of generating one or more first interference signal include generating m first interference signals, m being positive integer above 1, each of the m first interference signals being out of phase with respect to one another by 1/m of the time period of one of said m first interference signals.

22. The method of claim 21, wherein the step of generating one or more first interference signal further includes splitting the first light beam into m light beams each corresponding to a respective one of the first interference signals.

23. The method of claim 15, wherein the analysis spectrum is a Fourier spectrum.

24. The method of claim 21, wherein said integer m is three (3).

25. The method of claim 24, wherein the step of generating one or more first interference signal includes splitting the first light beam into three (3) light beams each corresponding to a respective one of the three first interference signals.

* * * * *

UNITED STATES PATENT AND TRADEMARK OFFICE
CERTIFICATE OF CORRECTION

PATENT NO. : 5,039,222
DATED : August 13, 1991
INVENTOR(S) : Akio IZUMI It is certified that error appears in the above-identified patent and that said Letters Patent is hereby corrected as shown below:

Claim 1, column 9, line 29, change "signals" to --signal--.

Claim 7, column 10, line 5, change "about" to --above--.

Claim 10, column 10, line 16, change "3" to --9--.

Claim 15, column 10, line 36, change "signals" to --signal--.

Signed and Sealed this

Twenty-fifth Day of May, 1993

Attest:

MICHAEL K. KIRK

Attesting Officer

Acting Commissioner of Patents and Trademarks